June 29, 1965
F. G. CARLSON ETAL
3,191,310
DISTANCE MEASURING DEVICE
Filed April 10, 1963
3 Sheets-Sheet 1
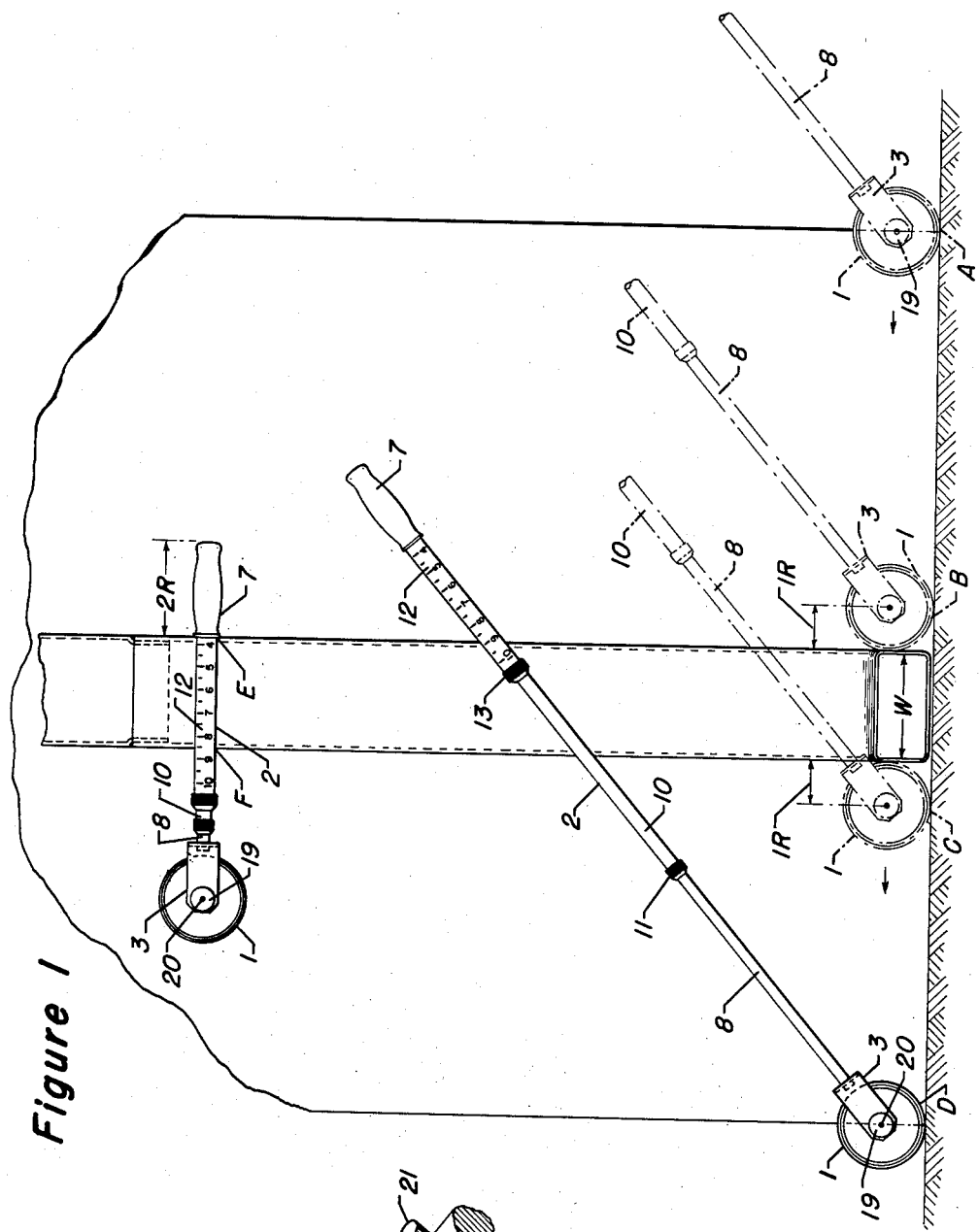
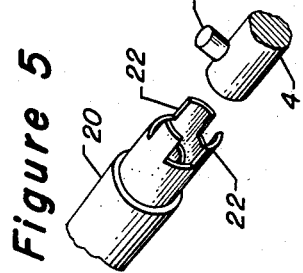
INVENTORS:
Frederick G. Carlson
Richard J. Brandt
BY: *Donald E. Moehling*
ATTORNEY.

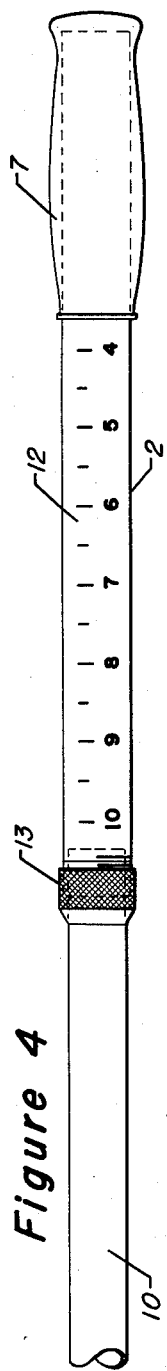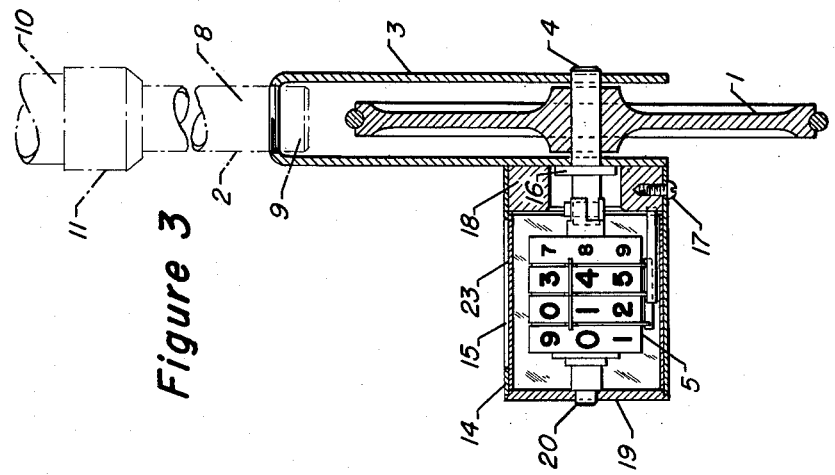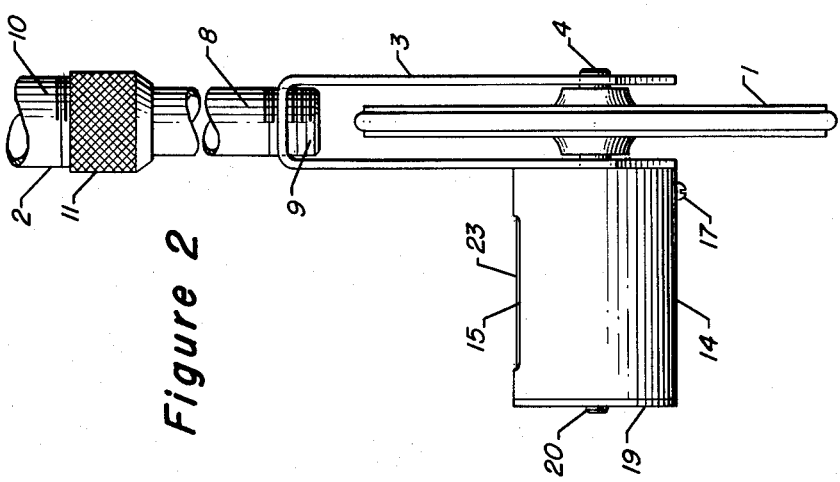

June 29, 1965  F. G. CARLSON ETAL  3,191,310
DISTANCE MEASURING DEVICE
Filed April 10, 1963  3 Sheets-Sheet 3
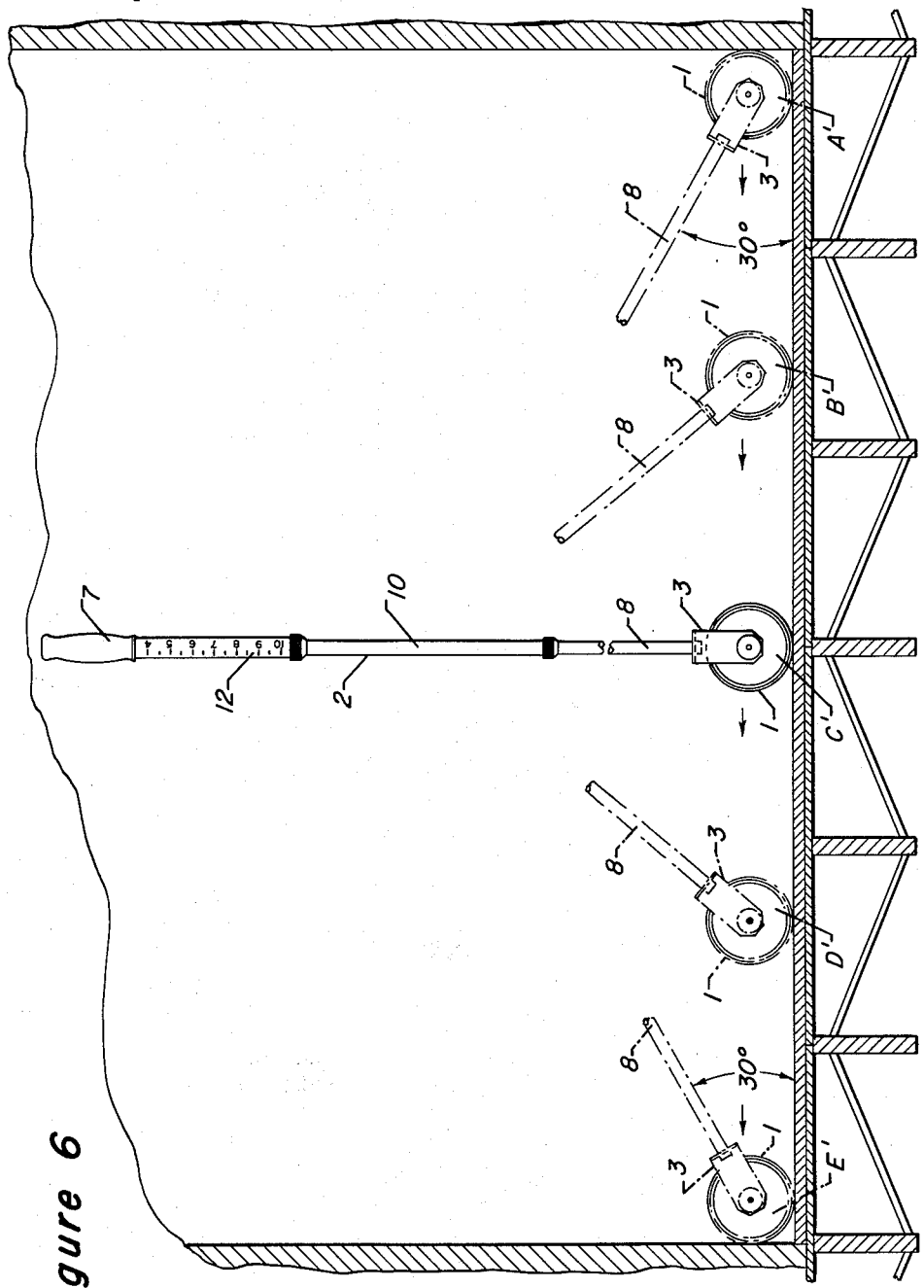
INVENTORS:
Frederick G. Carlson
Richard J. Brandt
BY:
Donald E. Moehling
ATTORNEY.

United States Patent Office 3,191,310
Patented June 29, 1965

3,191,310
DISTANCE MEASURING DEVICE
Frederick G. Carlson, 1169 Margret St., Des Plaines, Ill., and Richard J. Brandt, 737 Florence Ave., Park Ridge, Ill.
Filed Apr. 10, 1963, Ser. No. 271,908
1 Claim. (Cl. 33—141)

This invention relates to a portable device for measuring linear distances between points on a surface, including rectilinear as well as curvilinear distances. More specifically, this invention concerns a rotatable measuring wheel journalled at one end of an extendable handle and axially engaged with a counter mechanism which registers directly the number of whole units and the fractional units of distance between two points on a surface to be measured. Several other embodiments of the present invention relate to means incorporated into the physical structure of the present device for correcting the recorded distance between the points to be measured to account for errors otherwise caused by irregular displacements or projections from the line being measured or caused by the inability of the wheel, because of its finite diameter, to zero in on the corner between a vertical wall and the surface to be measured.

One of the most frequently recurring problems in measuring, encountered by architects, contractors, realtors, etc., is the problem of determining with reasonable accuracy the inside dimensions of rooms, from wall to wall and the measurement of the dimensions of building foundations having irregular projections extending beyond the line of measurement, such as downspouts attached to a foundation wall being measured, the projection causing the introduction of a significant error in the dimension of the wall. Thus, the wall-to-wall dimensions of a room using a rotary wheel measuring device are often inaccurate to the extent that the radius of the wheel at the starting and finishing points is not included in the determined measurement because the wheel is stopped a distance corresponding to the radius of the wheel from the wall projecting vertically from the surface being measured. The improved rotary measuring device provided by the present invention incorporates into its design means for correcting such errors.

One object of this invention, therefore, is to provide an improved rotary device for measuring linear distances more accurately than rotary measuring devices presently available for the same purpose. Another object of this invention is to provide a rotary measuring device which is compact and of small size and accordingly readily portable.

In one of its embodiments this invention relates to a linear distance measuring device comprising in combination: a wheel rotatably mounted at one end of a handle, a counter-mechanism axially engaged by the axle of the wheel so as to register the rotations of the wheel in units of length correlated to the distance to be measured, said wheel having a circumference of 12 inches and a rule marked on said handle in inches, beginning at a point approximately 12/pi inches from the end of the handle opposite to said wheel.

Other embodiments of this invention are illustrated in the accompanying diagrams, FIGURE 1 of which illustrates one of the uses for the present device, including a side elevational view of the device with the telescoping handle collapsed to its most compact form and a side elevational view of the device with the handle portion fully extended; FIGURE 2 is a front elevational view with only the lower portion of the first section of the telescoping handle shown; FIGURE 3 is a cross-sectional view of the mechanism as viewed from a centerline parallel to the plane of the paper, including a dissection of the counter portion of the device; FIGURE 4 is a side elevational view of the complete upper section of the handle, illustrating the ruled portion of the handle and the handle grip which serves a special use in the operation of the present distance measuring device. FIGURE 5 is an exploded enlarged isometric view of the coupling between the wheel and the axle of the counter mechanism, providing a structure which enables the counter mechanism to be readily removed with ease from the present device, and FIGURE 6 illustrates the measurement of the distance between parallel walls utilizing the self-correcting features of this invention.

Referring to the accompanying diagrams, the present rotary measuring device generally is a combination of several functional elements, including a wheel 1 rotatably journalled at the end of handle 2, for example, in a bearing at the lower extension of the handle, such as an inverted U-shaped yoke 3, the handle being attached to the apex of the yoke. Rotation of the wheel concurrently rotates axle 4 which is journalled into the lower end of the handle and is keyed or press fitted into the wheel to rotate and to register distance with the clockwise (i.e., as viewed from the side of the device facing the free end of axle 4) rotation of the wheel. Axle 4 extends through bearings provided in each arm of the U-shaped yoke in which the wheel rotates, into a counter mechanism 5, which is capable of registering the number of revolutions of the wheel as distance traversed by the circumference of rotating wheel 1 in units of feet and whole number of inches, tenths of foot, or other unit of measurement in common usage, as hereinafter more fully described. Axle 4 which rotates in conjunction with the wheel to which it is keyed or fitted must of necessity operate the registering mechanism in directly proportionate ratio to the distance traversed by the periphery of the wheel. That is to say, if each rotation of the wheel is to register one rotation of the inch-registering dial (corresponding to twelve inches) and simultaneously record one foot on the unit dial of the counter mechanism, the circumference of wheel 1 must be exactly one foot and the diameter of the wheel must essentially be 12 inches/pi or approximately 3.82 inches.

The critical relationship of the wheel diameter to its foot-inch registering mechanism bears upon another feature involved in the design and operation of the device which provides a means for adjusting the recorded measurement of the distance between two spaced terminals, such as the distance between parallel walls or the dimensions of a building along its foundation or along a mortar line of a brick wall, from one corner of the building to the opposite corner. Inaccuracies in the measurements occur when the device encounters a perpendicular projection of significant width, such as one or more downspouts, protruding from the plane surface of the wall, as shown in FIGURE 1 of the accompanying diagrams.

Since measurement of the longitudinal distance along the foundation or wall is started (i.e., with the counter mechanism set at zero reading) at one corner, with the wheel touching the surface whose length is to be measured at its junction with the intersecting surface, the measurement of the longitudinal distance is accurate until the perpendicular projection (e.g., the downspout) stops the wheel one radius from the protruding perpendicular surface. Similarly, on the far side of the projection, rotation of the wheel can be started from the protruding surface on the far side of the projection one radius of the wheel from the perpendicular surface. Even after adding the width of the projection to the distance measured from each corner to the perpendicular surfaces on each side of the projection, the recorded measurement does not account for the two radii of the wheel in approaching the projection up to and away from each side of the projection. These relationships which are exemplified in a typical situation involving a downspout 6 projecting perpendicularly from a vertical, plane wall are illustrated in FIGURE 1. Thus, measurement of the longitudinal distance from one corner of the wall to the next adjacent corner is started at point A, representing one corner, with the counter mechanism 5 set at zero. Although wheel 1 is illustrated in FIGURE 1, for reasons of clarity, as being rolled on the ground surface adjacent to the wall which is being measured (i.e., in which wheel 1 rotates in a plane parallel to the wall surface), the device may also (in many cases, preferably) be held by the operator in the position in which wheel 1 rotates in a plane parallel to the ground surface (i.e., vertical to the wall surface), the wheel being rolled along a horizontal line, such as a mortar line between adjacent layers of bricks. As the operator, in making a measurement, moves the device to the left, rotating wheel 1 and simultaneously registering the distance over which the wheel rotates on counter mechanism 5, the device is stopped at point B (the device being shown in phantom at point B) as the periphery of the wheel contacts downspout 6 projecting perpendicularly from the surface of the wall. The device is thereafter lifted from position B and after increasing the reading on counter mechanism 5 to the extent of a correcting factor, the derivation of which is furnished by the device itself, as described hereinbelow, the wheel is again placed on the surface to be measured, at position C in which the periphery of wheel 1 is in contact with the far side (i.e., on the downstream side of the obstacle) of downspout 6, also projecting perpendicularly from the wall. The device is thereafter moved to position D, and the series of digits representing the measurement of the distance from corner A to corner D is then read from the counter mechanism. The measurement is accurate, however, only to the extent that the correcting factor is accurate; otherwise, the reading on the counter mechanism represents only a rough approximation of the true distance from A to D. Thus, without applying any correction factor, the reading taken from the counter mechanism would fail to record not only the width "W" of the downspout, but also one radius of the wheel on each side of the downspout, the omitted portion of the distance from A to D, not registered on the counter mechanism, would be the distance from B to C, consisting of the width "W" of downspout 6 and two radii or one diameter of wheel 1. By means of the measuring device of this invention a self-contained measurement correcting means is provided in the device whereby the aforementioned correcting factor may be incorporated into the distance reading at the stage of the measurement that the obstruction occurs and by readily usable means. The terminal section of the telescoping handle portion of the present device is a ruler or standard, marked in inches, from zero at the end of the handle to a number of inches corresponding to the width of most generally encountered projections, usually up to 10 to 12 inches, the diameter of the wheel being separately indicated on the handle by a conspicuous indicative marking. In order to provide an accurate measurement of the distance from point A to point D, utilizing the aforementioned correction factor of this invention, the wheel is raised from the surface to be measured at position B (i.e., before placing the wheel in contact with the surface at position C), the ruled handle portion of the device is placed along a horizontal line across the width of the projection, with one edge of the projection coincident with the wheel diameter mark E on the handle to thereby measure in inches the width "W" of the projection plus the diameter of the wheel. The combined total correction factor (the distance from B to C) is thereby read directly from the handle at the ruler marking coincident with the opposite edge of the projection (point F on the ruler), as shown in FIGURE 1 of the diagram. The distance reading on the ruler of the handle (point F on the ruler) is then added to the previously registered distance on the counter mechanism for the distance from A to B by manually rotating the wheel the measured distance indicated by the reading "F" on the ruler. The wheel is thereafter placed in position C on the surface to be measured and moved to position D, completing the accurate and direct determination of the distance from A to D as now registered on the counter mechanism.

A conspicuous and conveniently applied means for indicating the diameter of the wheel on the ruler portion of handle 2 where its relationship to the process of measuring distance with the present device is most apparent is illustrated in FIGURE 1 by handle grip 7 over the uppermost end of the handle portion, the grip corresponding in length to two radii or one diameter of wheel 1, so that the beginning of measurement of the width of the projection is marked by the inside edge of the handle grip on the ruler scale, as at E. The reading on the scale at point E is 3.82 inches or 12 inches/pi, corresponding to the diameter of wheel 1 which thereby is automatically added to the actual width of projection 6 to account for the non-registered radial distances of the wheel on each side of the projection. Accordingly, by adding the reading on the rule to the distance registered on the counter mechanism the expedient herein provided enables the simplified, but accurate measurement of the total distance from A to D.

The self-correcting feature of the present device is also applicable to the measurement of the distance between two vertically disposed surfaces, such as the floor or ground distance between two walls (as the walls on opposite sides of a room). As in the preceding example involving the self-correcting feature embodied in the present device, the counter mechanism is started from its zero reading one radius from one wall and the measurement process ends one radius from the wall on the opposite side of the space being measured. The present device is used in this situation as illustrated in FIGURE 6 hereof. Measurement is started with the counter mechanism at its zero setting, with the periphery of the wheel touching the wall in position A', and with the end of the handle approximately one foot above the surface at which position, the handle forms an angle of about 30 degrees with the surface. As the device is moved across the surface to the opposite, parallel wall, first to position B', then to positions C' and D' and finally to position E', the handle is rotated through an arc of approximately 120° (about one-third of a complete rotation, registering about one third of an additional rotation of the wheel, having a circumference of 12 inches or approximately one diameter of the wheel) and the end of the handle is again approximately one foot above the surface, again forming an angle of approximately 30° with the surface, but 120 clockwise degrees from the starting position. Thus, by providing a wheel of about 3.8 inches in diameter, the procedure herein for measuring between two parallel walls automatically compensate and self-corrects the counter mechanism for the two wheel radii error in the registered distance which would otherwise be present in the reading. This self-correcting feature however is realized only when the wheel diameter is about 3.8 inches, as in the specifications for the present device.

This invention is also designed and constructed to provide a compact, readily portable unit which in its collapsed form may be carried in a brief case, for example, or suitably even in the pocket of the operator's garment. This feature of the device is realized by the provision of a collapsible handle which during use of the device must of necessity be extendable to a length corresponding approximately to the user's waist height. The embodiment of this feature illustrated in the accompanying diagrams (e.g., FIGURES 1 and 4) indicate that handle 2 comprises three telescoping tubular sections of circular cross-section, including a lowermost end section 8 attached at its lowermost extremity by means of screw thread 9 in section 8, to yoke 3 in which a complementary female screw thread is provided to engage the threaded end of section 8 of the handle.

The maximum outside diameter of section 8 of handle 2 is limited by the inside diameter of the next adjacent section 10 (i.e., the middle section of a three-section handle) into which section 8 telescopes when handle 2 as a unit is collapsed. The telescoping sections are maintained in an extended form by means of a pressure-friction fit between section 8 and section 10 of the handle, provided by knurled nut 11 which is threaded onto the lowermost extremity of tubular section 10 and contains an internal female thread gradually tapered inwardly toward the upper end of the thread so that the internal, threaded surface at the lower end of tubular section 8 is drawn down snugly upon the external surface of section 8 when nut 11 is turned onto section 10 of the handle and advanced upwardly. In similar manner the uppermost section 12 of handle 2 has an internal diameter sufficient to slide over the external surface of section 10 of the handle in close-fitting relationship thereto and knurled nut 13 at the lower end of section 12 similarly has an inwardly tapered thread which draws the lower end of tubular section 12 down upon the outer surface of the next lower adjacent section 10 of the handle as nut 13 is screwed onto the lower end of tubular section 12. By telescoping the tubular sections together (i.e., when nuts 11 and 13 are loosened) to their minimum extension, which provides the maximum degree of compactness the device may be, in effect, locked in this form for ready portability by turning nuts 11 and 13 down tightly onto the next adjacent lower section or the device may be extended to its maximum or to any intermediate degree of extension by withdrawing the sections (i.e., after loosening nuts 11 and 13) to the desired degree of extension, being thereafter maintained in this form and in this degree of extension during use of the device by tightening nuts 11 and 13 onto sections 10 and 12, respectively, of handle 2 and thereby providing the pressure fit of the lower end of section 10 onto section 8 and the lower end of section 12 onto section 10, respectively, required to fix these positions of the sections relative to each other.

One of the features of the measuring device of this invention is the provision in the unit of a replaceable counter mechanism (indicated in FIGURE 3 of the diagrams by the numeral 5), the element of the combination which receives the greatest mechanical wear and which generally is the element requiring most frequent replacement or repair by virtue of its inherent mechanical structure. Counter mechanism 5 is not in and of itself claimed herein to be patentable, and in general, is old in the art, but in combination with other elements of the device is an integral portion of the device constituting the present claimed invention, particularly with respect to certain structural features which make this element readily removable from the remaining elements of the device and replaceable, if necessary by another similar counter mechanism. The entire counter mechanism element 5 is enclosed within a housing 14 having a slot 15 in its upper surface which provides a window for visually observing the series of digits registered by the device on the series of parallel, adjacent reels comprising the mechanism. The reel nearest the wheel contains twelve digits, numbers 1 to 12 (if recorded in inches) or ten digits (if parts of a foot are to be read in tenths) and rotates with the clockwise (as viewed from the end of axle 4 free of the counter mechanism) rotation of wheel 1. Since the circumference of wheel 1 is 12 inches and since the first reel in the series rotates concurrently clockwise with wheel 1 (when the device is moved in a forward direction along the surface to be measured), said first reel records the number of inches or twelfth fractions of a foot traversed by the wheel. The next reel adjacent to the first reel in series contains 10 equally spaced digits, numbered 1 to 10 and advances one digit (corresponding to one foot) for each complete rotation of the inch-registering reel. The third reel in the series of adjacent reels registers units of 10 and contains numbers 1 to 10 equally spaced around the face of the reel, advancing one unit of ten for each 10 rotations of the unit-of-one reel. The fourth reel in the series of adjacent reels registers units of 100 and also contains numbers 1 to 10 equally spaced around the face of the reel, advancing one unit-of-100 for each 10 rotations of the 10-unit reel or 100 rotations of the unit one reel. The counter mechanism is reset to zero, with all reels simultaneously resetting to zero, by not more than two counterclockwise rotations of wheel 1, depending upon the setting of the reels when the mechanism is reset to zero.

Axle 4 which is fixed to wheel 1 and therefore rotates concurrently with wheel 1, extends through the bearing provided by the opposing and horizontally aligning orifices in yoke 3 into the counter mechanism within housing 14 and is fixed in its horizontal position within the housing by means of a shoulder 16 on axle 4 at a position spaced horizontally on the axle to provide the necessary extension of the axle through both bearings in the parallel arms of yoke 3.

Housing 14 is retained in removeably fixed position by means of set screw 17 projecting through a hole in housing 14 into a threaded bore in internal annular ring 18 which, in turn, is fixedly attached to yoke 3, for example, by welding the ring to the yoke. An end piece 19 in the form of a close fitting insert within the cylindrical housing (or which may alternatively comprise the end of a unitary structure with housing 14) and containing an aperture in the central portion of the end piece, provides a bearing for suspending the rotating, free end of central axle 20 which extends through the counter mechanism and which transmits the rotation of axle 4 to the reels aligned in parallel relationship to each other along the axle.

The other end of central axle 20 of the counter mechanism releasably engages the end of driving axle 4 on which wheel 1 is fixedly mounted. Axle 4 extends into housing 14 sufficiently to engage the end of axle 20 and together with the suspension provided at the other end of axle 20, the counter mechanism is thereby suspended within housing 14. The end of axle 20 which loosely and releasably engages the end of axle 4 within the housing does so by a loose fitting slot-in-pin combination, as shown in FIGURE 5 of the accompanying diagram, FIGURE 5 illustrating in an exploded cut-away enlargement of the claw-type coupling between the ends of axles 20 and 4. The coupling comprises a claw in the hollow end of axle 20 into which axle 4 fits in readily engageable or disengageable relationship to axle 20. Pin 21 which projects perpendicularly above the surface of axle 4 near the end of the latter axle inside of housing 14 slides into the trifurcated claw in the hollow end of axle 20 between fingers 22 comprising the claw. The torque produced in axle 4 as wheel 1 rotates is transmitted through the coupling to axle 20 which carries the reels comprising the counter mechanism 5. The openings between fingers 22 of the claw are of a size and shape that permit pin 21 to slide into the claw easily and without pressure, permitting the counter mechanism to be readily removed from the housing for repairs or replacement. In the event that the counter mechanism malfunctions by reason of wear or breakdown, set screw 17 is removed from the annular ring 18 releasing housing 14 from ring 18 to thereby expose the reel assembly which is thereafter disengaged from axle 4 by withdrawing the assembly from the coupling. Alternatively, pin 21 may extend through axle 4 and project from both sides of the axle, being then used in conjunction with a bifurcated claw in the end of axle 20.

Any other form of the counter mechanism capable of registering the number of revolutions of the wheel in consistent units of measurement correlated with the circumference of wheel 1 may be utilized in the present device, no claim of novelty being made therefor. A transparent cylinder, such as cellophane cylinder 23 may be inserted inside of housing 14 to provide an internal covering for window 15.

We claim as our invention:

A linear distance measuring device comprising a handle, a wheel having a circumference of 12 inches, rotatably mounted at one end of the handle and a separate handle grip approximately 3.8 inches in length on the other end of the handle, a counter mechanism axially engaged by said wheel which registers the number of rotations of the wheel in units of length correlated to the distance to be measured, and a rule marked on said handle in inches and parts of inches, the point corresponding to zero on said rule being the end of the handle grip opposite the end of the handle on which said wheel is mounted.

References Cited by the Examiner
UNITED STATES PATENTS

| | | | |
|---|---|---|---|
| 37,002 | 11/62 | Lawrence | 33—141 |
| 399,966 | 3/89 | Buchanan | 33—141 |
| 718,396 | 1/03 | Smith | 33—141 |
| 1,145,706 | 7/15 | Schulte | 33—111 |
| 1,389,946 | 9/21 | Harriman | 33—111 |
| 1,485,096 | 2/24 | Tiller | 33—134 |
| 2,295,787 | 9/42 | Hirth | 33—141 |
| 2,356,544 | 8/44 | Swanson | 33—161 |
| 2,662,292 | 12/53 | Pickard | 33—141 |
| 3,088,208 | 5/63 | Mitchell | 33—111 X |

ISAAC LISANN, *Primary Examiner.*